May 20, 1941.  H. J. GLOVER  2,242,859
WEDGE
Filed Feb. 8, 1940
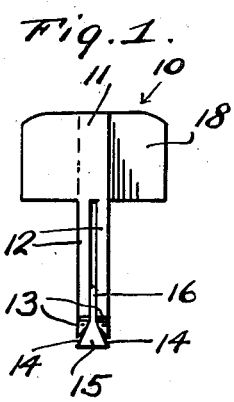
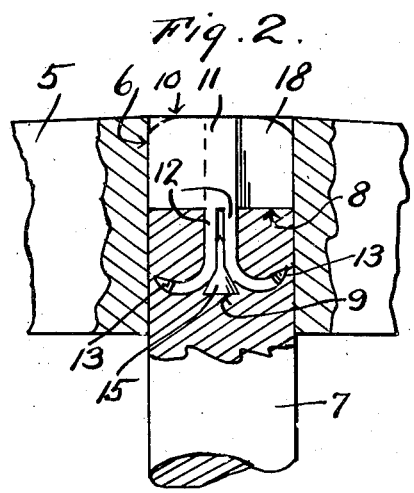
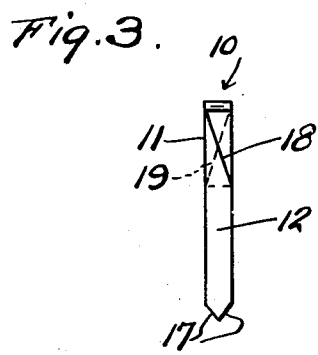
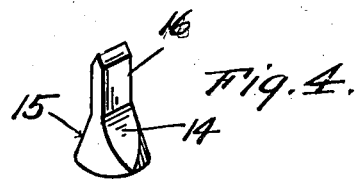
Inventor
Harry J. Glover
By L. B. James
Attorney Patented May 20, 1941

2,242,859

UNITED STATES PATENT OFFICE 2,242,859

WEDGE

Harry Jonson Glover, San Bernardino, Calif.

Application February 8, 1940, Serial No. 317,957

1 Claim. (Cl. 306—33)

This invention relates to tools having wooden handles and more particularly locking wedges therefor.

The primary object of this invention resides in the provision of a tool handle wedge having certain portions thereof adapted to be spread so as to lock the wedge into the tool handle.

Another object of this invention resides in the provision of a tool handle locking wedge having certain portions thereof adapted to be spread by an auxiliary wedge while driving the main wedge into the tool handle.

A further object of this invention resides in the provision of a tool handle locking wedge having a head of particular construction.

A still further object of this invention resides in the particular association of the auxiliary wedge with the main wedge to cause certain portions of the main wedge to spread when being driven into the tool handle.

Aside from the aforesaid objects this invention resides in the particular construction of the tool handle whereby the wedge may be readily inserted therein prior to driving it into locking position.

With these and other objects in view this invention resides in certain novel features of construction and arrangement of elements to be hereinafter more particularly set forth in the specification, illustrated in the accompanying drawing and pointed out in the appended claim and, while the present disclosure depicts my present conception of the invention, the right is reserved to resort to such changes in construction and arrangement of parts as come within the scope of the claim.

In the accompanying drawing forming a part of this application,

Figure 1 is a front view of a tool handle locking wedge constructed in accordance with this invention.

Figure 2 is a sectional view through the head of a tool showing the wedge in locking position in the handle thereof.

Figure 3 is a side view of the wedge.

Figure 4 is a perspective view of the auxiliary wedge, per se.

In the present illustration of this invention the numeral 5 designates a tool head of any type having a hole 6 therein adapted to receive a wooden or other similar form of handle 7, said handle is provided with a slot 8 at that end thereof inserted in the hole 6 and a centrally disposed bore 9 for a purpose to be hereinafter set forth.

The numeral 10 designates a metal or other form of wedge consisting of a head 11 and spaced parallel arms 12 having their free ends bevelled as at 13 to coincide with bevelled sides 14 of an auxiliary wedge 15, said auxiliary wedge is provided with an elongated lug 16 having its free end bevelled to permit it to be readily inserted between the arms 12 of the wedge and further to permit it to be easily guided between the arms 12 while driving the wedge into the tool handle.

The aforesaid arms have their free ends further bevelled as at 17 so as to reduce frictional contact with the sides of the bore 9 and permit the arms to readily spread when driving the wedge into the tool handle.

In the preferred form of the wedge as illustrated in Figures 1 to 3 inclusive the head of the wedge is bevelled as indicated by the numerals 18 and 19.

With the tool handle constructed as aforesaid it is inserted into the hole 6 of the tool head whereupon the arms 12 of the wedge having the auxiliary wedge 15 retained therebetween at their ends is inserted into the bore 9 of the tool handle and, upon driving the wedge into the slot of the handle the bevelled head 11 thereof will jam the split end of the handle against the sides of the hole 6 within the tool head during which operation inward movement of the arms 12 against the auxiliary wedge 15 seated in the bore 9 will cause them to spread and thus lock the wedge against accidental dislodgement from the handle.

Having thus described my invention what I claim and desire to protect by Letters Patent is:

A wedge for tool handles comprising a substantially triangular head having the major portions of opposite sides thereof bevelled downwardly to form unaligned sharpened edges, spaced parallel arms disposed crosswise of the lower end of the head and extending downwardly from the medial portion thereof with their ends sharpened and their opposed lower portions bevelled and an auxiliary wedge removably carried between the free ends of the arms.

HARRY JONSON GLOVER.